(No Model.) 2 Sheets—Sheet 1.
G. H. TITCOMB.
DREDGING MACHINE.
No. 515,029. Patented Feb. 20, 1894.
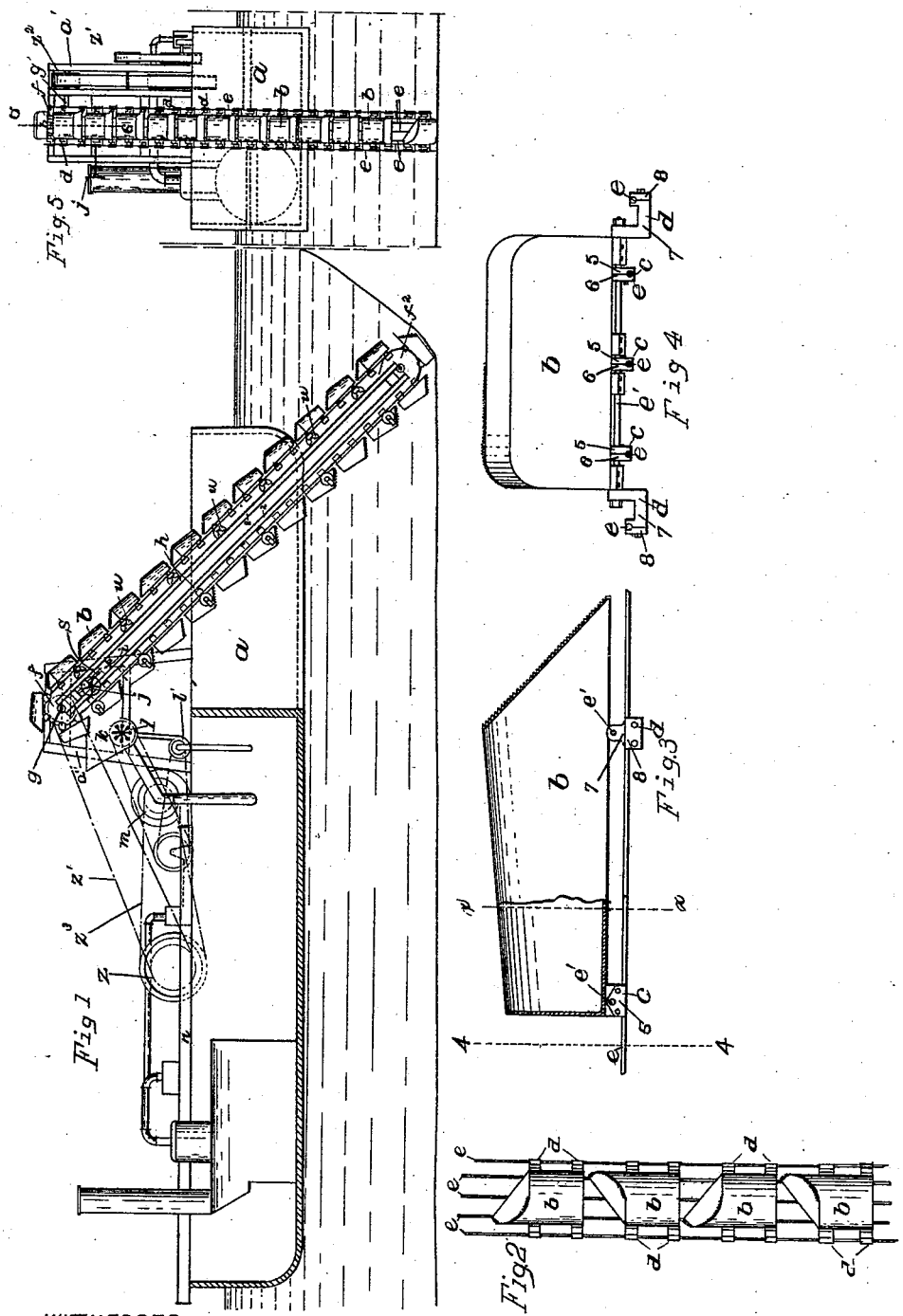
WITNESSES
INVENTOR.

(No Model.) 2 Sheets—Sheet 2.
G. H. TITCOMB.
DREDGING MACHINE.
No. 515,029. Patented Feb. 20, 1894.
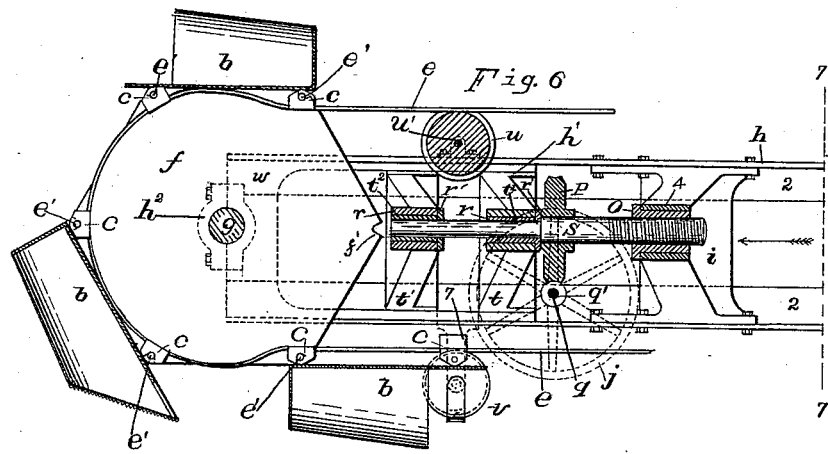
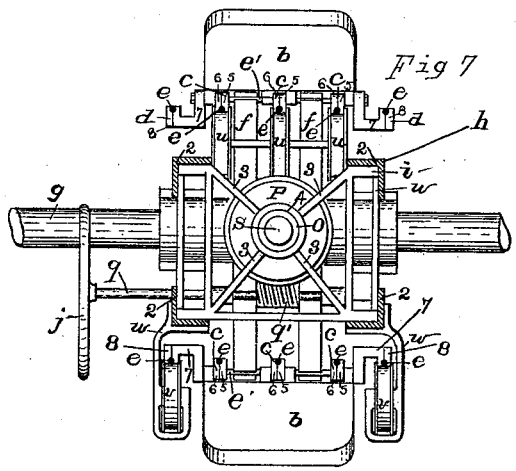
WITNESSES:
N. B. H. Gilbert
E. C. Smith
INVENTOR
George H. Titcomb

UNITED STATES PATENT OFFICE.

GEORGE H. TITCOMB, OF BOSTON, MASSACHUSETTS.

DREDGING-MACHINE.

SPECIFICATION forming part of Letters Patent No. 515,029, dated February 20, 1894.

Application filed January 14, 1893. Serial No. 458,334. (No model.)

*To all whom it may concern:*

Be it known that I, GEORGE H. TITCOMB, of Boston, in the county of Suffolk and State of Massachusetts, have invented certain new and useful Improvements in Dredging-Machines, of which the following is a specification.

This invention relates to dredging machines employing a navigable vessel and an endless chain or series of buckets, mounted on a swinging frame and impelled by power on the vessel.

The invention particularly relates to machines of this class, in which the buckets are connected in an endless series by wire ropes, instead of by links as ordinarily.

The invention has for its object, first, to provide an endless series of buckets, connected by endless wire ropes, with means for supporting the same, so that the series of buckets can swing to different positions, and can be adjusted to take up the slack caused by the stretching of the wire ropes.

The invention also has for its object to provide an improved form of bucket, whereby the strain exerted on the buckets and on the supporting mechanism will be reduced to the minimum when the buckets strike the surface from which they remove the excavated matter.

The invention consists, first, in a dredging machine comprising a hull or vessel, a frame pivotally connected thereto, and an endless series of buckets connected by endless wire ropes, the frame being of telescopic construction and provided with means hereinafter described and claimed whereby it may be elongated to take up the slack caused by the stretching of the ropes.

The invention also consists in an endless series of buckets, the mouths or entering ends of which are beveled, so that one side of the bucket will strike the submerged surface from which the excavation is to be taken before the other side, thus causing the bucket to act gradually and without sudden strain on the supporting mechanism, the bevel of each bucket being opposite that of the next, so that the beveled form of one bucket is compensated for by the opposite bevel of the next.

The invention also consists in certain details of construction and combinations of parts, all of which I will now proceed to describe and claim.

In the accompanying drawings, forming part of this specification: Figure 1 represents a longitudinal section of the hull of a dredging machine, showing in side elevation a dredging apparatus or mechanism embodying my invention. Fig. 2 represents a plan view, showing a part of the series of buckets and their wire rope connections. Fig. 3 represents a partial side elevation and a partial section of one of the buckets, the part in section being between the line $x$—$x$ and the left-hand end of the bucket. Fig. 4 represents a section on line 4—4, Fig. 3, looking toward the right. Fig. 5 represents an end elevation of the dredging machine shown in Fig. 1. Fig. 6 represents an enlarged section on line 6—6, Fig. 5. Fig. 7 represents a section on line 7—7, Fig. 6, looking toward the left.

The same letters of reference indicate the same parts in all the figures.

In the drawings: $a$ represents the hull of a dredging machine, the same being of any suitable construction.

$b\ b\ b$ represent buckets, which are connected in an endless series by endless wire ropes $e\ e$, of which there may be two or more, four being the preferred number.

$h$ represents a swinging frame, which supports the ropes and buckets, and is mounted at its upper end to swing in a vertical plane on a horizontal shaft $g$, which is journaled in bearings on a supporting-frame $a'$ on the hull $a$. The frame $h$ is here shown as composed of four longitudinal angle beams 2 2 2 2 (Figs. 6 and 7), which may be rigidly connected in any suitable way to form a structure of suitable strength. I show as one of the means for connecting said angle beams a frame or spider $i$, which extends across the spaces between the beams and is rigidly secured thereto, said spider having converging arms 3 3 3 3, which support a collar or sleeve 4, to which is affixed an internally-threaded collar or nut $o$, forming a part of the mechanism hereinafter described for taking up the slack in the wire ropes $e$ caused by the stretching of the latter.

$f\ f$ represent polygonal wheels, affixed to the shaft $g$ and provided with recesses $f'$ at the angles of their faces, for engagement with transverse rods $e'$, which are affixed by clamps $d\ d$ to the two outer ropes $e$, and by clamps $c$ $c\ c$ to the intermediate ropes. Each clamp $d$ is here shown as composed of an angular arm or jaw 7, rigidly attached to a rod $e'$ and offset therefrom, and a jaw 8 detachably bolted to the jaw 7, the object of the offset form of the jaws 7 being to accommodate them to the lower series of rope-supporting pulleys $v$ (Fig. 7) hereinafter referred to. Each clamp $c$ is shown as composed of two parts or jaws 5 6, the jaw 5 being rigidly attached to a rod $e'$, while the jaw 6 is detachably bolted to the jaw 5, the clamps $c$ being formed to run on the upper series of rope-supporting rollers $u$ presently described.

The buckets $b$ have flat inner sides, and are so arranged on the ropes that said inner sides bear on the alternate faces of the polygonal wheels $f$ in passing around said wheels, as shown in Fig. 6. Similar polygonal wheels $f^2$ are provided at the lower end of the frame $h$, the buckets passing around the wheels $f^2$ in the same manner that they do around the wheels $f$. The frame $h$ is of telescopic construction, so that it can be elongated to increase the distance between the upper supporting wheels $f$ and the lower supporting wheels $f^2$, for the purpose of taking up the slack in the ropes $e$ caused by the stretching of said ropes. To this end, I provide the upper portion of the frame with a sliding section $h'$, to which are affixed the bearings $h^2$ of the shaft $g$, said section being adapted to slide in the main body of the frame to increase or decrease the distance between the wheels $f$ and $f^2$, the shaft of the wheel $f^2$ being journaled in bearings affixed rigidly to the main body of the frame $h$.

I have provided means for adjusting the sliding section $h'$, and for holding it at any position to which it may be adjusted, said means, as here shown, being, first, a shaft S (Figs. 1, 6 and 7), screw-threaded at one end and engaged with the nut O above mentioned, the other end of said shaft being smooth and engaged with sockets $r$, formed in spiders $t\ t'$, which are affixed to the section $h'$; and, secondly, a shaft $q$, journaled in bearings in the sliding section $h'$ and provided with a worm $q'$, meshing with a worm-gear P affixed to the shaft S. The shaft S is provided with shoulders or collars $r'$, which bear against the sleeves $t^2\ t^2$ forming parts of the spiders $t\ t'$, the arrangement being such that, when the shaft S is moved in the direction indicated by the arrow in Fig. 6, it will exert pressure in the same direction on the spiders $t\ t'$, and thus increase the distance between the wheels $f$ and $f^2$ by virtually elongating the frame in which said wheels are journaled. The described movement of the shaft S will be produced by rotating it in the proper direction through the shaft $q$, which is provided at one end with a hand-wheel $j$, said hand-wheel being located so that it may be conveniently grasped by an attendant on the vessel. It will be seen, therefore, that, in case the ropes $e$ stretch, as they will be likely to do from time to time, the slack thus caused may be readily taken up, so that the ropes may be kept under a proper degree of tension, and the strain exerted on them in impelling the buckets may be equalized throughout the entire length of the ropes.

$u\ u\ u$ represent loose pulleys, mounted upon shafts $u'$, which are journaled in bearings on the upper side of the frame $h$, said pulleys having grooved peripheries, formed to receive the clamps $c$ and the ropes $e$, as shown in Fig. 7. $v\ v$ represent similarly grooved pulleys, the shafts of which are journaled in bearings formed in arms or brackets $w\ w$, affixed to the lower sides of the frame $h$ and extending downwardly therefrom, as shown in Fig. 7, said pulleys $v$ being arranged to support the outer ropes $e\ e$ at various points along the under side of the frame. The connection between the ropes afforded by the transverse rods $e'$ enables the intermediate ropes to be also supported at the lower side of the frame by the pulleys $v\ v$, while the outer ropes at the upper side of the frame are in like manner supported by the rollers $u\ u$, which act directly on the intermediate ropes.

The employment of endless wire ropes connecting the series of buckets, and the provision of means for taking up the slack caused by the stretching of said ropes, are important features of my invention, and I believe them to be new with me.

I am aware that it has been heretofore proposed to connect a series of buckets by wire ropes; but, so far as I know, no provision has ever been made for increasing the distance between the wheels supporting said ropes, in order to take up the slack of the ropes. I find that wire ropes are greatly superior to the chain links in common use for connecting an endless series of buckets, because with the ropes there is no such lash or lost motion as occurs with the use of links; and, when the ropes are kept under a proper degree of tension, the strain caused by the contact of the buckets with the material being excavated is uniformly distributed throughout the entire length of the ropes, instead of being borne by the connections at one side of the supporting-frame, as is the case when links, necessarily having a considerable end-play or lash, are employed.

Power is or may be imparted to the shaft $g$, to impel the buckets, from a driving-pulley $z$, which receives power from an engine or motor on the vessel $a$, and is connected by a belt $z'$ with a pulley $z^2$ (Fig. 5) affixed to the shaft $g$.

The matter elevated by the buckets falls from the point of delivery from the buckets into a hopper $k$, and may be removed therefrom in any suitable way, such as by gravitation or by the use of a pump. I have here shown a force-pump $m$, mounted upon the vessel $a$, said pump being of suitable construction for forcing the matter from the hopper $k$ through a pipe-line to the desired point of delivery, the pump being impelled by means of a belt $z^8$ from the driving-shaft.

$l$ represents a rotary stirring or agitating device in the hopper $k$, said device being preferably a horizontal shaft provided with wings or beaters, and arranged in a trough or depression at the bottom of the hopper.

$l'$ represents a pump, adapted to force a suitable quantity of water into the hopper to properly dilute the matter emptied into the hopper by the buckets, the dilution being necessary in order to cause the excavated matter to flow readily through the pipe-line.

I do not limit myself to the details of mechanism here shown, and may variously modify the same without departing from the spirit of my invention.

Having thus described the nature of my invention and explained a way of constructing and using the same, although without attempting to set forth all of the forms in which it may be made or all of the modes of its employment, I declare that what I claim is—

1. A dredging machine, comprising in its construction a floating support, a telescopic frame pivotally connected therewith and composed of two sections, wheels carried by the two sections respectively, an endless carrier supported on said wheels, a shaft rotatable in bearings on one of the sections but movable longitudinally therewith, said shaft having a screw-threaded portion engaging a fixed nut carried by the other section, a worm-gear fixed on the shaft, and a worm engaging said gear and supported in bearings on the section of the telescopic frame in which the plain portion of the screw-shaft rotates.

2. In a dredging machine, the combination of a floating support or vessel, a frame pivotally connected therewith, and a plurality of buckets connected in an endless series on said frame, the mouths of the buckets being inclined or beveled, so that one side of each bucket is in advance of the opposite side, some of the buckets being inclined in one direction and some in the opposite direction, as set forth.

3. In a dredging machine, the combination of a pivoted frame having upwardly projecting pulleys $u\ u$ at its upper side, and downwardly projecting pulleys $v\ v$ at its lower side, the series of endless wire ropes supported by said pulleys, the pulleys $v\ v$ being arranged to support the outer ropes of the series at the lower side of the frame, while the pulleys $u\ u\ u$ are arranged to support the intermediate ropes at the upper side of the frame, the transverse rods clamped to said ropes and the buckets secured to said rods and ropes, as set forth.

In testimony whereof I have signed my name to this specification, in the presence of two subscribing witnesses, this 2d day of January, A. D. 1893.

GEORGE H. TITCOMB.

Witnesses:
   C. F. BROWN,
   A. D. HARRISON.